US005771459A

United States Patent [19]
Demery et al.

[11] Patent Number: 5,771,459
[45] Date of Patent: Jun. 23, 1998

[54] COMMUNICATION SYSTEM FOR USE WITH STATIONARY AND SECOND ENTITIES, VIA A WIRELESS INTERMEDIATE NETWORK WITH GATEWAY DEVICES, A GATEWAY DEVICE FOR USE WITH SUCH SYSTEM, AND A MOBILE ENTITY PROVIDED WITH SUCH GATEWAY DEVICE

[75] Inventors: David A. Demery; Frans Zijderhand; Edwin W. Mulder, all of Eindhoven, Netherlands

[73] Assignee: U.S. Philips Corporation, New York, N.Y.

[21] Appl. No.: 491,190

[22] Filed: Jun. 16, 1995

[30] Foreign Application Priority Data

Jun. 21, 1994 [EP] European Pat. Off. .............. 94201763

[51] Int. Cl.⁶ .............................. H04B 7/00; H04Q 7/20
[52] U.S. Cl. .......................... 455/517; 455/524; 370/401
[58] Field of Search ................................ 455/54.1, 54.2, 455/56.1, 33.1, 12.1, 13.1, 517, 510, 524, 422; 370/85.13, 94.1, 94.3, 95.3, 401, 466; 375/349

[56] References Cited

U.S. PATENT DOCUMENTS

| | | | |
|---|---|---|---|
| 4,872,162 | 10/1989 | Tanaka et al. | 370/466 |
| 5,426,637 | 6/1995 | Derby et al. | 370/85.13 |
| 5,457,680 | 10/1995 | Kamm et al. | 455/56.1 |
| 5,473,608 | 12/1995 | Gagne et al. | 370/94.3 |
| 5,490,140 | 2/1996 | Abensour et al. | 370/85.13 |
| 5,553,316 | 9/1996 | Diepstraten et al. | 455/63 |

FOREIGN PATENT DOCUMENTS

514972A2  12/1992  European Pat. Off. ........ G01C 21/20

*Primary Examiner*—Reinhard J. Eisenzopf
*Assistant Examiner*—Gertrude Arthur
*Attorney, Agent, or Firm*—Robert J. Kraus

[57] ABSTRACT

A communication system connects stationary and second entities via a cellular radio intermediate network. Each such entity has its own network that is separate from the intermediate network, and connects to the intermediate network by a gateway device. A gateway transfers a message while executing protocol conversion under interpretation of a message header. The conversion maintains in the header at least a predetermined subset of the following: Source Address, Geographic Address, Priority Level, Reliability Level, Delay Requirement, Expiry Time and Repetition Time. A critical distinction exists between connectionless and connection-oriented service.

9 Claims, 3 Drawing Sheets

| | INFORMATION ELEMENT | TYPE |
|---|---|---|
| 120 — | | |
| 122 — | Start | M |
| 124 — | Element Identifier | M |
| 126 — | Source Address | O |
| 128 — | Destination Address | M |
| 130 — | Geographic Address | O |
| 132 — | Connection Request Type | M |
| 134 — | Priority Level | O |
| 136 — | Reliability Level | O |
| 138 — | Delay Requirement | O |
| 140 — | Expiry Time | O |
| 142 — | Repetition Time | O |
| 144 — | User Data Length | M |
| 146 — | End | M |

COMMUNICATION SYSTEM FOR USE WITH STATIONARY AND SECOND ENTITIES, VIA A WIRELESS INTERMEDIATE NETWORK WITH GATEWAY DEVICES, A GATEWAY DEVICE FOR USE WITH SUCH SYSTEM, AND A MOBILE ENTITY PROVIDED WITH SUCH GATEWAY DEVICE

BACKGROUND OF THE INVENTION

The invention relates to a communication system for use with one or more stationary first entities and multiple second entities via a wireless intermediate network. In many usages, the second entities are mobile, for example as wheeled vehicles. In other applications, the second entities are stationary, or even more or less permanent. In general, stationary entities can be managed more easily than mobile entities, as far as the communication facilities go. A particular, non-limitative embodiment for such wireless intermediate network is a cellular radio network. Such networks have already found widespread use in telephone communication, in particular for usage with vehicle-located telephone sets. Moreover, combined usage of such cellular communication with an in-vehicle network with one or more stations, and also with networking at the stationary side of the cellular system would represent an advantageous extension on various levels of use.

SUMMARY OF THE INVENTION

Now, various advantageous features would be the following:
- to allow for interconnection between any combination of fixed and mobile networks for both connection-oriented and connectionless service. In a connection-oriented service, first a connecting link is established between two applicable stations, before the actual information transfer can be effected. In a connectionless service, this establishing is foregone, and the information transfer is undertaken immediately. Both schemes have their advantages; the establishing of the link will require some overhead, but once the link has been established, the overall transfer has a higher efficiency.
- to allow entities to be addressed on an individual, group, generic, or geographic-area basis;
- to allow standard features such as Quality of Service (QoS) parameters to be included in the transfer, either jointly or individually, such as Priority Level, Reliability Level, Delay Requirement.
- to allow for the inclusion of "lifetime information", so that messages are deleted automatically when they are considered no longer valid, such as messages that are used in repeated broadcast applications and store-and-forward messaging.

In consequence, amongst other things it is an object of the present invention to provide a communication system according to the preamble, that in a consistent manner transfers data across separate networks, that may be disparate or not. An important restriction is that the traffic on the wireless network should be restricted in volume, as especially this network has limited transfer capability at relatively high cost. Now, according to one of its aspects, the invention is characterized in that each said one or more first entities and each said second entity comprises a respective further network that is separate from said intermediate network, and each further network is interfaced to said intermediate network by means of a respective gateway device arranged for transferring a message while executing protocol conversion under interpretation of a message header which conversion maintains in the header at least a predetermined subset of header contents of a set comprising Source Address, Geographic Address, Priority Level, Reliability Level, Delay Requirement, Expiry Time, and Repetition Time. The first entities are generally applications, all of the various networks may be organizationally different on any of the various protocol layers, but through the invention the movement of data through the communication system is handled in a consistent manner.

Advantageously, the system accommodates at least one of an individual destination address, a group destination address, and a generic destination address. A useful convention is that an address can consist of letters, digits, or any combination thereof. A group (destination) address means that a plurality of respective destinations may be reached through using a single address. A particular embodiment is that the group can include all destinations. According to generic addressing, a common address formulation describes a particular destination, without the source of the address having to know the physical address of the destination. On the other hand, a geographic area address means that the information is intended for distribution over a specific area of the intermediate network that is described in a suitable way without the source of the message having to know the identity of the effectively reached destination.

Advantageously, the system comprises at least one control gateway being arranged for setting up a broadcast communication link with one or more intended target entities. This means that it is considered superfluous to ascertain the presence and receptivity of any addressee that may be addressed as part of a prespecified group.

Advantageously, the system comprises at least one gateway device being arranged for under control of a received request, enabling the setting up in association to that request, of a connectionless service to one or more intended target entities. According to this form of communication, all addressing information and user data are sent together with no fixed communication link between end users in place. By itself, such type of link has been used in a different environment, to wit, so-called E-mail, where intermediate networks are considered irrelevant: the physical link is established simultaneously with the data transfer. The present invention however, in an environment where the positioning of the destination stations may change in an extremely dynamic and fast manner, advantageously expresses the request for a connectionless service in an explicit manner.

Advantageously, the system comprises at least one gateway device being arranged for under control of a received request, enabling the setting up in association to that request, of a connection-oriented service to one or more intended target entities. According to this form of communication, first the physical link between the two entities is established. Subsequently the transfer proper is effected. For particular categories of communication, the connection-oriented service may be particularly advantageous or even mandatory, in view of transfer efficiency or other considerations.

The invention also relates to a gateway device for use in a system according to the above, and to a vehicle comprising such gateway device connected to an in-vehicle local area network for use in such system. Various further advantageous aspects are recited in dependent claims.

BRIEF DESCRIPTION OF THE DRAWING

These and other features and advantages of the invention will be further described hereinafter with reference to the disclosure of preferred embodiments, and in particular in and by the appended Figures that show.

DESCRIPTION OF PREFERRED EMBODIMENTS

Figures 1, 4:
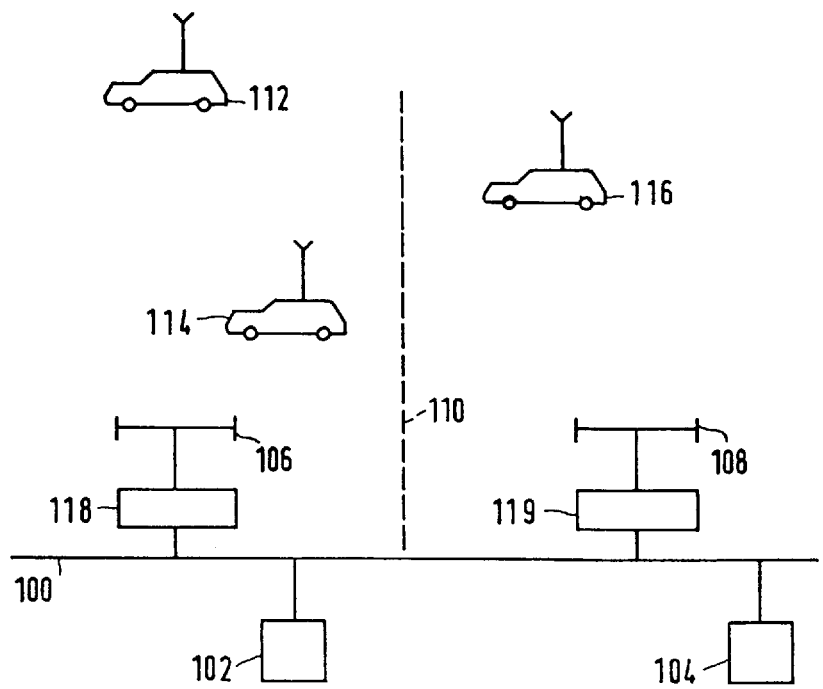
FIG. 1 is an overall diagram of applying a system.
FIG. 4 shows an exemplary header format.

FIG. 1 shows a simplified overall diagram of applying the system. Line 100 symbolizes a wide area communications network. Blocks 102, 104 are so-called applications or services that will be considered more in detail hereinafter. Network 100 interfaces to a cellular radio system by means of gateway devices 118, 119 and associated antennae 106, 108, which together with other operational parameters such as transmitting power defines a cell of the cellular broadcast network. The separation between the cells has been symbolized by line 110. In fact, the separation may be diffuse. However, the invention is not limited to usage with a cellular network, inasmuch as the division may be on another level rather than according to geographical regions, such as according to frequency range. Items 112, 114, 116 are mobile entities such as motor vehicles that each are provided with an antenna that via an internal gateway, not shown, interfaces to an internal communication network. Two networks that are coupled via an intermediate gateway must be allowed to be disparate, that is, they may be completely different and also, are completely separate. In particular, a network at one side of a gateway need have no knowledge of the network at the other side. In particular, the in-vehicle network should not need standardization as seen from the wireless network. In practice, the situation is much more complicated, because of the larger geographic area, the larger number of stationary and mobile entities, and the concatenation of networks in a more extended sequence.

Figure 2:
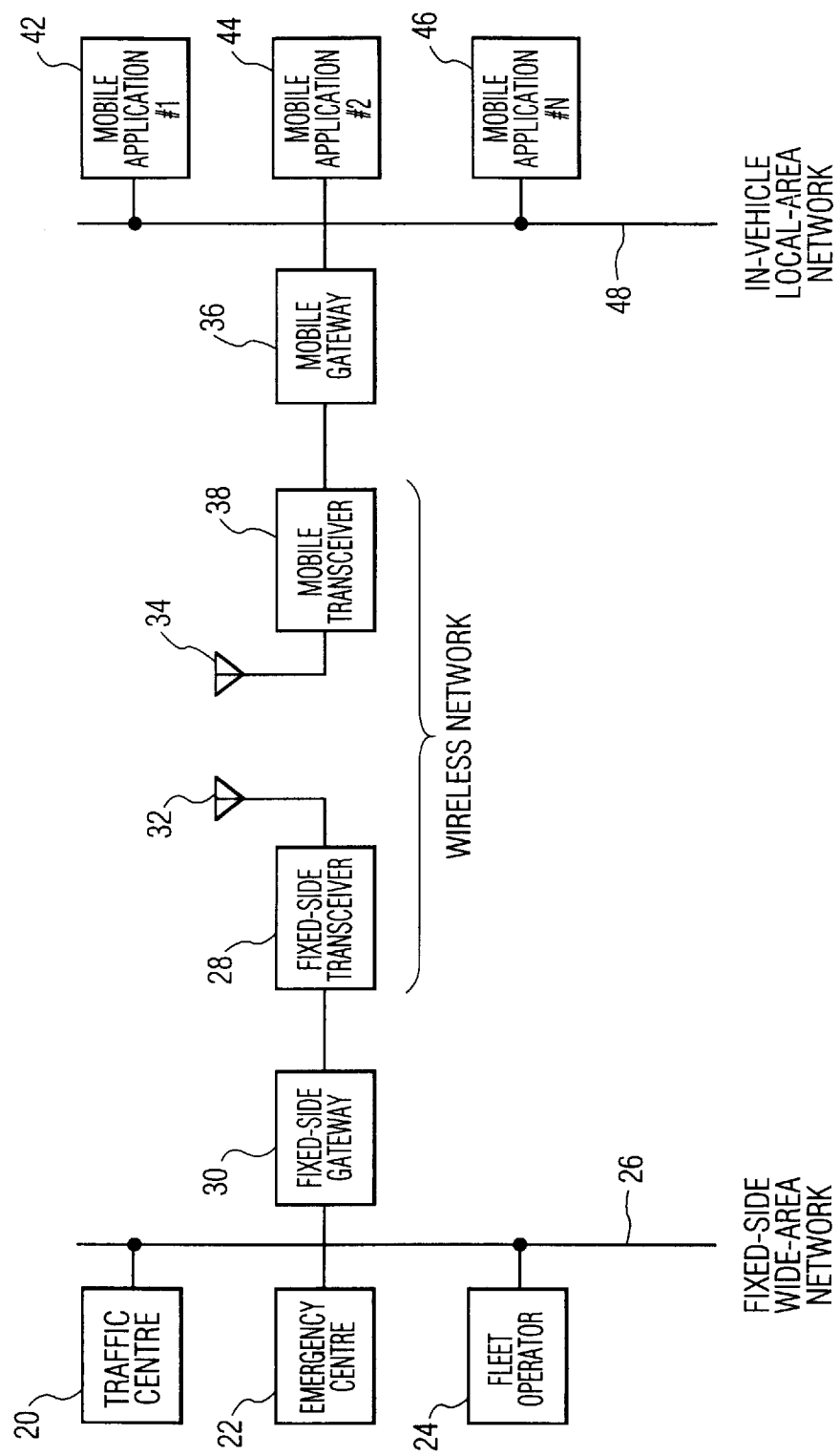
FIG. 2 is an overall view of a network architecture.

FIG. 2 is an overall view of a multi-network architecture for use in the present invention. At the left hand side is a fixed-side wide-area network 26. Three stations are, by way of example, a traffic centre 20 that operates to communicate various types of information to the vehicles, such as weather forecasts, road and traffic condition data indicating traffic jams, roadworks in progress, icy road surface, and other, emergency centre 22 that receives emergency calls from vehicles and may address particular subcategories such as police or firefighting vehicles, and fleet operator 24 that interfaces to particular vehicles for controlling effectual routing thereof, rendez-vous, and other particular operations. These various applications are mapped on appropriate hardware, which has not been detailed hereinafter, as being outside the scope proper of the invention. Similar mappings apply to the gateway devices, to the applications at right, and to the transceiver devices. Block 30 is a fixed-side gateway device that interfaces to network 26. Block 28 symbolizes a fixed-side transceiver that connects to antenna 32. Examples of network 26 are a Wide Area Network, Ethernet, PSTN, and PSPDN; by themselves, such networks are not part of the present invention. Antennas 32, 34 as shown support a cellular radio network that by means of judiciously chosen frequencies, broadcast range, and antenna distribution divides a large terrestrial region into effectively separated compartments. By themselves, cellular mobile networks are well known. In other environments the central wireless network does not rely on cellular radio, but on another technology: inter alia, also infrared transmission would be applicable. Block 38 is a mobile transceiver that interfaces to antenna 34. Block 36 is a mobile gateway device that interfaces to an in-vehicle local area network 48 that has in-vehicle applications 42, 44, 46 which are separately accessible. Now, the vehicle generally receives a stream of data elements that are linked in a sequence and which are used for various purposes, each data element possibly representing such a different application.

A first such exemplary application is a navigating centre that determines an optimum route under driver-indication of an intended destination, as based on actual position of the vehicle, road and traffic conditions, sensing of actual vehicle displacement, and map data from a large data base.

A second such exemplary application communicates with the vehicle specific information considered relevant, such as available parking space and public transport information to the vehicle, emergency calls from the vehicle, and various others that depend on actual location and possibly on various situational parameters of the vehicle.

A third such exemplary application receives broadcast messages of general interest that may be communicated to the driver person subject to particular conditions such as the category of the vehicle, the particular condition the vehicle is in (stopped, cruising, travelling or responding to emergency), or certain wishes expressed by the driver. The above is only a selection of a much larger range of feasible realizations. The in-vehicle network may be of known definition, such as for example described in EP Application 514,972, corresponding U.S. application Ser. No. 07/868, 747, now U.S. Ser. No. 08/386,605 FNG herein incorporated by reference, to the same assignee as the present application.

Connection between a first network and a second network may generally be done via router or gateway devices. A router carries out low-level directing of a data stream, wherein the destination may be reformatted, for example because the limited address range within a single network, and the message is redirected to the next router or station. However, most other parameters of the message on its various OSI levels are maintained. On the other hand, a gateway device may usually undertake protocol conversion, such as the mapping of a format used in the first protocol to a different format appropriate in the second protocol. For example, protocol X.25 has X.121 numbering, whereas IEEE 802 LAN has 48-bit numbering. A gateway device may also change the transmission rate so that the data can be carried correctly by the new transit network.

Figure 3:
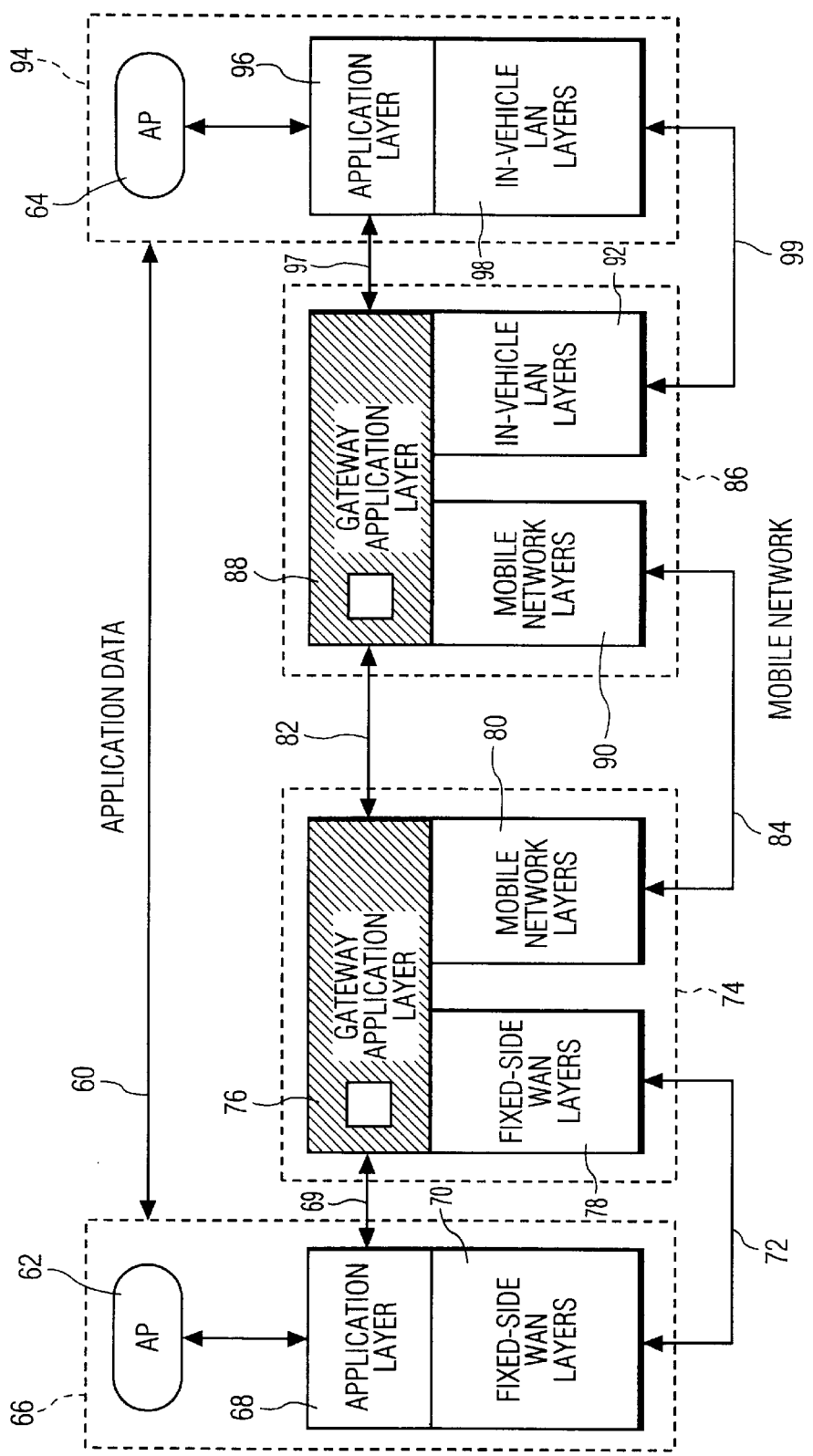
FIG. 3 is a multilayer interaction diagram of an embodiment of the invention.

FIG. 3 shows a multilayer interaction diagram or layering model of the invention. On a high level, two application processes, 62 at the stationary side, and 64 at the mobile side, exchange application data on a link 60. On the next lower level, there is an application layer according to its definition according to the OSI conventions. Here, process 62 in its station 66 has its application layer 68 that translates via link 69 to gateway application layer 76 in the gateway device 74 on the stationary side. The central part of the present invention relates to the gateway devices on the level of their respective application layers. Each gateway device correctly constitutes an operational station in the interfaced network. Application layer translates via link 82 to the application layer 88 in the gateway device 86 on the mobile side. Via link 97 this is furthermore to the application layer 96 in the mobile application 94. Generally, each lower layer adds formatting and other defining information to the information provided by the next higher layer. In particular, in blocks 76, 88, the essential elements of the invention are practised. If applicable, the number of sequenced blocks can be extended in either direction.

On the next lower level, the particularities of the respective network protocols are practised. At far left, block 70 contains the WAN (Wide Area Network) protocol part of the fixed or stationary side. Via link 72, the data is transferred to block 78, that contains the counterpart protocol to part 70. Gateway device 74 converts this protocol to the mobile network layers in block 80. Transfer on line 60 has the transfer on lines 69, 72, 82, 84, 97, 99 implicit. Transfer on line 69 has the transfer on line 72 implicit. Transfer on line 82 has the transfer on line 84 implicit. In particular, line 84 may represent a mobile network, such as a GSM, Mobitex, or other network that by itself is wellknown. Transfer on line 97 has the transfer on line 99 implicit. Block 90 is the counterpart of block 80 in gateway device 72. The protocol is next transformed to the protocol of the in-vehicle local area network LAN in block 92. Via link 99 this communicates with the in-vehicle LAN layers 98 of block 94.

FIG. 4 shows an exemplary header format for a message. For simplicity, the lengths in bits of the various parts have not been indicated. There are two categories of parts, the first is generally mandatory (M), the second is generally optional (O). Of course, for a particular situation or purpose, a particular O-type information may in fact be mandatory. The list is non-restrictive. Of course, the sequence of the parts may be changed, whereas other categories of information may be added to the header as well. The information categories shown allow for an explicit and complete definition of what the originator station or application wished to communicate. In being transformed by a gateway device, the relevant information categories of the header are maintained for retaining the optimum control facility offered by the header format shown.

Now, the first line 120 indicates the various categories and their types. The sequence of the header parts is generally according to the sequence of the lines in the Figure, although certain deviations may be useful as well. Line 122 indicates the start of the header. This being no functional element on the level of the header's meaning, the next gateway may decide to reformat. The same applies to line 146 that indicates the end of the header. Line 124 is an element identifier that signifies the category and/or the name of the message, for easier referral. Line 126 is the source address that may for example identify traffic centre 20. Line 128 is the destination address, that may for example identify application 42. Note that the information may flow in the opposite direction as well, or be bidirectional. Line 130 represents a geographic address, such as that identifies a particular geometric shape. On the next lower level it may then be translated to identify one or more broadcast cells. The addresses may be chosen from a prespecified directory. Line 132 indicates the connection request type, that may indicate broadcast, connectionless, connection-oriented, or other. This information is mandatory, because to a large degree it controls the various activities in the overall communication system. Line 134 indicates a priority level, such as definable in a range of two bits. This is the first part of the Quality of Service (QoS) parameters that represent the effective service offered. If priority is high it may overtake earlier queued messages of lower priority. Line 136 indicates a reliability level that may have various levels, and that may determine the associated parameters of the actual transfer. Low reliability may mean single transmittal, without additional protective measures; this may give failure in a few percent of the cases. Average reliability may mean single transmittal with addition of a check sum of for example 32 bits, and repeat upon detection of an error: this may restrict failure to less than 1% of all transmissions. High reliability may mean usage of forward error correction that adds redundancy to the message, addition of larger check sums, repeated transmission with the check sum in a different message, and other features. This may lower the failure rate to much less than 1%. Line 138 may give the longest allowable delay for transmission. Upon nearing the maximum of the allowable delay, the priority could temporarily be raised. The delay value may be in the range of minutes for a general information. In a critical situation this may be much less, such as in the range of 0.01 to 0.1 second for traffic signalizations in a railroad environment. Line 140 gives the expiry time. This indication is relevant if a message is sent repeatedly, but its relevance is considered over after some specified time, such as in the case of a weather forecast. The expiry time may be chosen from a particular prespecified repertory. Line 142 gives the repetition time, for example that a particular dangerous situation must be communicated every two minutes, whereas another item could require transmission only once every ten minutes. Line 144 indicates the user data length, for example in bytes. The message itself generally follows the header, but for simplicity no further detailing thereof has been done.

Now, in operation the following steps will be followed. First the origin station, such as fleet centre 24 sets the end destination identifier, and directs header plus data towards fixed-side gateway device 30. Next, gateway device 30 checks the end destination against its routing tables, and directs the data to the mobile gateway device, possibly undertaking any necessary protocol conversion. Mobile gateway device 36 now checks the end destination against its routing tables and converts the protocol if required.

Now, if the end address is a group address, the fixed-side gateway device for connection-oriented communication must set up links to each member of the group. If the information is directed to all mobiles in a given geographic area, the fixed-side gateway device must distribute the information over all radio cells that cover the area. Then the end destination is all mobiles. If a roaming vehicle wants to contact a particular utility (left hand column in FIG. 2), it uses a generic address. This means that the mobile does not know the name or number of the utility itself (the instance thereof that would be relevant in the cell or region), but it merely uses the generic number or name. The fixed-side gateway device, by means of address translation then makes the connection to the nearest appropriate utility. Encapsulation of the destination address within a header and the systematic usage of routing tables within network gateways allow to distribute information over a wide range of separate and possibly, disparate networks. The various extras allow for great flexibility.

We claim:

1. A communication system, comprising:

a primary wireless network;

at least one stationary first entity, and a plurality of non-stationary second entities, wherein each of the first and second entities includes a respective secondary network that is separate from the primary wireless network and a respective gateway device that interfaces the respective secondary network to the primary wireless network;

wherein each gateway device includes means for executing a protocol conversion of a received message which includes a message header and a message body without changing in the message header at least one of a set of message header items comprised of a source address, a destination address, a priority level indicator, a reliability level indicator, a delay requirement indicator, an expiration time indicator, and a repetition time indicator, but changing at least one of the set of message header items as required, in dependence upon the content of the message body and/or variable characteristics of a wireless link between a source entity and a destination entity; and, control means responsive to at least one of the unchanged message header items for controlling at least one of selective addressing of the destination entity, link operation, or message presentation to the destination entity.

2. The communication system as set forth in claim 1, wherein at least one of the secondary networks comprises a multistation network.

3. The communication system as set forth in claim 1, wherein at least one of the gateway devices comprises a control gateway device which is selectively operable for providing a broadcast communication link with a plurality of intended target entities.

4. The communication system as set forth in claim 1, wherein at least one of the gateway devices comprises a connectionless service gateway device which is selectively operable to provide a connectionless service to a plurality of intended target entities.

5. The communication system as set forth in claim 1, wherein at least one of the gateway devices comprises a connection-oriented service gateway device which is selectively operable to provide a connection-oriented service to a plurality of intended target entities.

6. The communication system as set forth in claim 1, wherein at least two of the secondary networks operate using different network communication protocols.

7. The communication system as set forth in claim 1, wherein the primary wireless network and at least one of the secondary networks operate using different network communication protocols.

8. The communication system as set forth in claim 2, wherein the primary wireless network and at least one of the secondary networks operate using different network communication protocols.

9. A gateway device for interconnecting at least two different networks which operate using different network communication protocols, the gateway device comprising:

means for executing a protocol conversion of a received message which includes a message header and a message body without changing in the message header at least one of a set of message header items comprised of a source address, a destination address, a priority level indicator, a reliability level indicator, a delay requirement indicator, an expiration time indicator, and a repetition time indicator, but changing at least one of the set of message header items as required, in dependence upon a relevance level of the content of the message body and/or variable characteristics of a wireless link between a source entity and a destination entity; and, control means responsive to at least one of the unchanged message header items for controlling at least one of selective addressing of the destination entity, link operation, or message presentation to the destination entity.

* * * * *